April 8, 1958     I. JEPSON     2,829,584
COFFEE MAKER
Original Filed Dec. 31, 1947
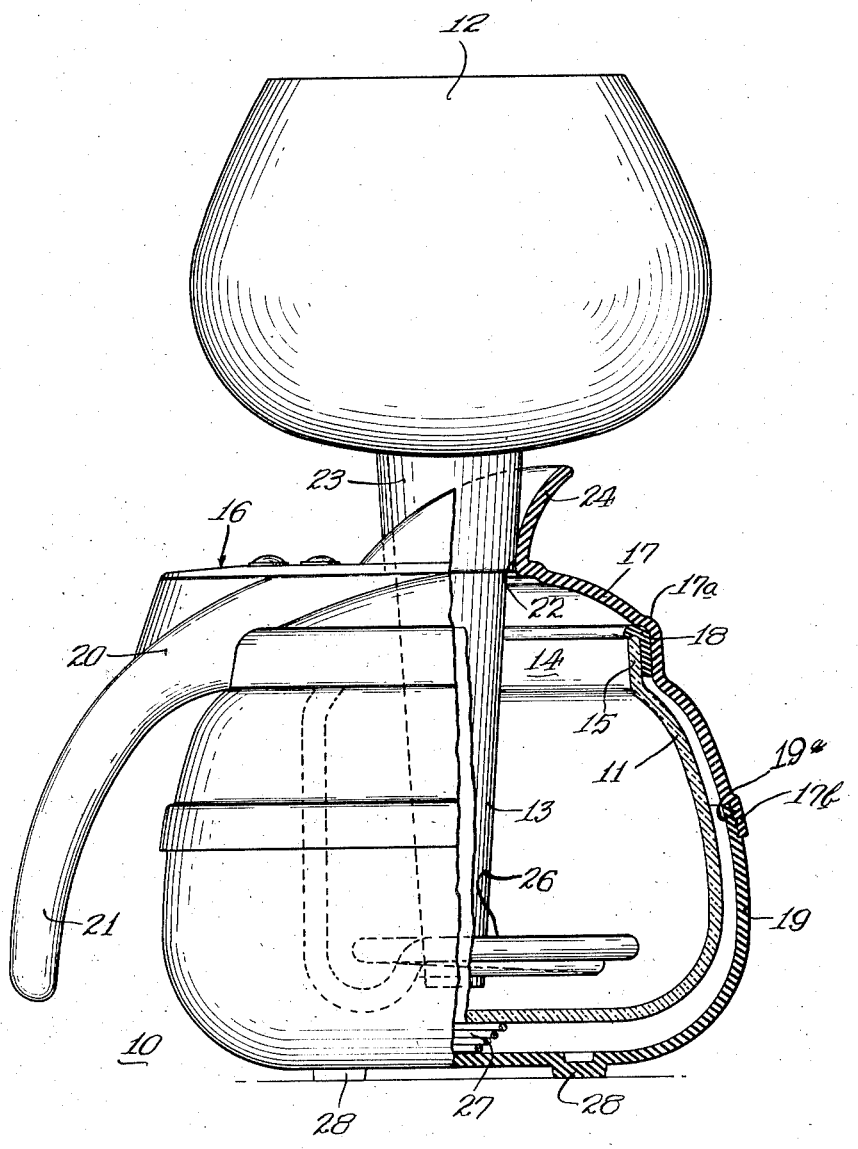
INVENTOR.
Ivar Jepson United States Patent Office 2,829,584
Patented Apr. 8, 1958

2,829,584

COFFEE MAKER

Ivar Jepson, Oak Park, Ill., assignor to Sunbeam Corporation, Chicago, Ill., a corporation of Illinois Original application December 31, 1947, Serial No. 794,959, now Patent No. 2,664,811, dated January 5, 1954. Divided and this application May 11, 1953, Serial No. 354,007

1 Claim. (Cl. 99—292)

The present invention relates to automatic cooking devices, and more particularly to beverage brewers and coffee makers. Specifically, the present invention is a division of Jepson application Serial No. 794,959, filed December 31, 1947, now United States Letters Patent No. 2,664,811 granted Jan. 5, 1954.

Beverage brewers and coffee makers of the so-called "vacuum type" have been extensively used in recent years. In general, this type of coffee maker comprises a lower heating chamber and an upper coffee infusion chamber. Conventionally, water is placed in the lower heating chamber or vessel, while the coffee grounds are placed in the upper vessel or chamber. As the water is heated in the lower chamber, water vapor pressure is created above the liquid in this chamber, which, when the temperature approaches the boiling point of water, forces the water into the upper chamber to infuse the coffee grounds placed therein. When the heat is removed from the lower chamber it cools, so that the water vapor contained therein condenses to form a vacuum, thereby causing the coffee to pass from the upper chamber through a suitable filter into the lower chamber, where it is preferably maintained at a predetermined temperature suitable for serving. The name "vacuum type coffee maker" comes from the fact that a vacuum is created in the lower vessel upon cooling thereof to cause the coffee to move from the upper vessel to the lower vessel. In the parent application of which this is a division, there is disclosed and claimed automatic means for cutting off the supply of heat to the lower chamber when the water has substantially all been forced into the upper chamber or vessel.

There are on the market today essentially two classes of automatic vacuum type coffee makers such as referred to above. In one of the classes of this type of coffee maker the chambers or vessels are made of metal, and the heating element is built into the bottom of the lower metal chamber or vessel. An example of this type of coffee maker is disclosed and claimed in United States Letters Patent No. 2,312,555, Jepson, assigned to the same assignee as the present application. In this type of coffee maker it will be understood that when substantially all of the water has been forced from the lower chamber, a very rapid increase in temperature of the metal bottom of this lower chamber will result, and such rapid increase in temperature of the base or bottom of this vessel is utilized to actuate a thermostatically controlled switch for shutting off the heat at the proper time. This coffee maker operates very satisfactorily and is extensively sold on the market, and has been accepted as the ultimate in automatic coffee makers. This construction, obviously, involves a relatively expensive design, and it would be desirable to provide a satisfactory coffee maker of less expensive construction employing vessels of glass, plastic, or nonmetallic materials, together with control means which may be adjusted accurately in a simple manner.

The other class of coffee maker of the vacuum type discussed above comprises vessels or chambers of glass, together with an electrical heater which is incorporated in a separate stove-like unit. An example of this type of coffee maker is disclosed in United States Letters Patent No. 2,287,583, Weeks. In this class of coffee maker it is apparent at once that a difficult problem of control arises due to the remote relationship of the electrical heater with respect to the interior of the lower water heating vessel. Numerous means of control have been employed with this second class of vacuum type coffee maker where glass vessels have been used. One common expedient has been to employ a float in the lower vessel which indicates the level of the water in the lower vessel, together with means to actuate a switch when the float has moved to its lowermost position. Such float means have been relatively complicated and often have comprised magnetic devices exerting electromagnetic forces through the glass container walls to perform a switch-controlling function. Obviously, such float control devices complicate the apparatus from the standpoint of washing and cleaning the same.

In the above-mentioned parent application there is disclosed and claimed an automatic coffee maker of the vacuum type particularly adapted for application to glass vessels wherein the heating element comprises an immersion type heating element, and the control means are all embodied in a unitary assembly which comprises the greatly improved control mechanism disclosed and claimed in the parent application. There is a large group of people who feel that coffee should only be made in a glass container to insure the best possible taste. Unfortunately, any frangible vessel such as a glass vessel is subject to breakage unless handled with great care at all times. This has been a decided deterrent to the use of glass vessels for automatic coffee makers even with the availability of the improved control means disclosed and claimed in the parent application. The problem of the upper vessel being made of glass is much less serious than that of the lower vessel, since it is used only during the actual short coffee-brewing period; but the lower vessel, which is conventionally used as the pouring vessel, is subject to damage when made of frangible material unless handled with great care.

It would be desirable to provide an improved automatic coffee maker wherein the advantages of a glass coffee maker may be employed and yet wherein the danger of breakage is greatly reduced. Accordingly, it is an object of the present invention to provide a new and improved automatic coffee maker.

It is another object of the present invention to provide for a frangible coffee maker means to protect the same against breakage.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the single figure of the accompanying drawing, which is an elevational view, partly in section, of an automatic coffee maker embodying the present invention.

Referring now to the single figure of the drawing, there is illustrated a coffee maker, generally designated by the reference numeral 10, comprising a lower water heating chamber or vessel 11, and an upper coffee infusion chamber or vessel 12. Preferably, these vessels are made of glass, although any other suitable material might be employed. The upper vessel or chamber 12 is provided with the conventional depending tube 13, which is adapted to be inserted into the lower vessel, as illustrated in the drawing, thereby to provide communication between the upper vessel 12 and the lower vessel 11. As illustrated, the lower vessel 11 has an open top 14, defined by an upright flange 15. Associated with the lower vessel 11 is a unit of assembly, generally designated by the reference numeral 16, which unit, together with the two vessels 11 and 12, effectively comprises the entire coffee maker. This unit of assembly 16 includes a cover portion 17 which effectively defines a portion of a protective shell for enclosing and protecting the frangible vessel 11, and encloses substantially half, namely, the upper half, of the vessel 11. This cover portion 17 of the unit of assembly 16 includes a shoulder portion 17a for conforming with the peripheral flange 15 of the frangible vessel 11. For the purpose of providing an effective seal between the cover portion 17 and the peripheral flange 15, there is included an annular gasket 18. The cover portion 17 further includes a flanged portion 17b which is threaded to receive a cooperating cup-shaped shell portion 19 having a cooperating threaded portion 19a so as to engage the threaded portion of the cover 17, thereby defining a complete protective shell enclosing the vessel 11 and spaced somewhat therefrom, as clearly indicated in the drawing.

The protective shell comprising the cover member 17 and the lower cup-shaped member 19 may be formed of any suitable molded insulated material. It should be understood, however, that it might also be formed of any other suitable material, including metal. The upper cover member 17 is preferably molded as an integral unit with the housing of the unitary assembly 16, including a body portion 20 and an integrally formed handle 21, which handle serves as a means for handling the coffee maker. The upper portion of the cover member 17 has an opening defined therein, designated by the reference numeral 22, the walls of which opening make sealing engagement with the depending tube 13. When molded of suitable insulating material, the opening 22 is sufficiently resilient to be slipped over a flange 23, which may be a resilient gasket defined on the depending tube 13. Moreover, the portion of the cover 17 above the opening 22 is integrally formed into a pouring spout 24, so that when the upper vessel 12 is removed together with the depending tube 13, the lower vessel 11 may be manipulated as a coffee-pouring vessel by means of the handle 21, with the coffee being poured from the spout 24. As in the parent application, the unit of assembly 16 also includes a heating element 26, which is illustrated as an immersion type heating element insertable into the lower vessel 11. This provides a simplified construction without the necessity of the separate stove unit employed in prior art arrangements.

Preferably, the bottom of the member 19 defining the lower half of the protective shell for the frangible lower vessel 11 may include suitable leg portions 28 which might comprise a single annular protrusion or a plurality of individual protrusions, as illustrated. A suitable resilient cushioning means 27, which might comprise a rubber pad or a coiled spring as shown in the drawings, cushions the base of the frangible vessel 11 and also maintains the peripheral flange 15 in sealing engagement with the gasket 18, and in turn maintains the gasket 18 in sealing engagement with the shoulder 17a of the cover member 17. The resilient cushioning means 27, therefore, effectively shockproofs the frangible vessel 11, which frangible vessel might be termed an interliner of the protective shell comprising the portions 17 and 19. The glass vessel 11 can readily be inserted into the bottom of the cover member 17, whereupon the resilient cushioning means 27 and the cup-shaped member 19 are assembled in the manner shown. With this arrangement a predetermined space is maintained between the outer protective shell comprising the members 17 and 19, and the vessel 11, which space serves as a heat insulator.

From the above description it will be apparent that there has been provided an automatic coffee maker effectively comprising a glass or frangible vessel 11 whereby water may be heated in a glass vessel to satisfy those who believe that coffee should only be made in glass vessels. At the same time there is provided a protective shell which is simple and compact and which may be associated with the frangible vessel 11 in an easy manner. Moreover, the protective shell may be designed to have a very pleasing appearance in addition to performing its function of completely protecting the glass vessel 11. With the present construction the coffee maker may be handled in a rather careless manner without danger of damaging the glass liner 11, and, as a result, the inherent disadvantage of the glass coffee maker is completely overcome while still retaining the desirable features thereof. Furthermore, the frangible vessel 11, which is effectively a glass liner, can readily be replaced if for some unforseen reason it becomes damaged. The unit of assembly 16, including the immersion heater 26 and the control means associated therewith, as more fully described in the parent application referred to above, is admirably suited to be combined with the shockproof arrangement described above.

While there has been illustrated and described a single embodiment of the present invention, it will be understood that various changes and modifications of the invention will occur to those skilled in the art, and it is aimed in the appended claim to cover all such changes and modifications as fall within the true spirit and scope of the present invention.

What is claimed as new and desired to be secured by Letters Patent of the United States is:

A coffee maker comprising a lower frangible vessel including an upstanding flange defining an opening therein, a unit of assembly including a first protective shell portion partially enclosing said vessel and a second protective shell portion cooperating with said first portion to complete a protective enclosure for said vessel, said second portion comprising a unitary assembly including a handle, a spout, and an immersion type heating element depending into said vessel, said spout extending from means defining an opening in said second shell portion, and an upper vessel having a depending tube extending into said frangible vessel through said opening in said second portion, said upper vessel being supported in spaced relationship with respect to said frangible vessel by the means defining said opening.

References Cited in the file of this patent

UNITED STATES PATENTS

| | | |
|---|---|---|
| 1,987,892 | Duevel et al. | Jan. 15, 1935 |
| 2,164,158 | Masin | June 27, 1939 |
| 2,190,522 | Pagliuco | Feb. 13, 1940 |
| 2,227,540 | Fry | Jan. 7, 1941 |
| 2,462,349 | Battilani | Feb. 22, 1949 |

FOREIGN PATENTS

| | | |
|---|---|---|
| 653,683 | Germany | Nov. 30, 1937 |
| 579,265 | Great Britain | July 29, 1946 |